Patented Aug. 26, 1941

2,253,587

UNITED STATES PATENT OFFICE 2,253,587

PRODUCTION OF POLISHED SURFACES

Noel Shaw, Ivy Lea, Bank Top, Haydon Bridge, Northumberland, England, assignor to Carbide and Carbon Chemicals Corporation, a corporation of New York No Drawing. Application December 7, 1938, Serial No. 244,359. In Great Britain December 10, 1937

3 Claims. (Cl. 91—68)

This invention relates to the production of polished surfaces and has particular reference to the treatment of the surfaces of stone and brick buildings, building materials such as tiles and panels, and plaster, woodwork and the like, to improve their appearance and wearing qualities and resistance to moisture and other deteriorating agents.

With the above object in view the present invention consists essentially in applying to the surface a preservative layer of liquid adapted to leave a more or less hydrated silica deposit, and in rubbing the layer into the surface in the manner of French polishing whereby a highly polished effect is attained. More particularly the liquid employed is a known highly efficient surface preservative formed by reacting (hydrolyzing) an ester or a mixture of esters of silicic acid with water in the presence of a solvent for the ester which is also adapted to carry water in solution or suspension. The solvent, however, may contain the water, or some of the water, required for the reaction. The proportion of water must not exceed that required to hydrolyze and convert the ester into the corresponding alcohol and silica. Hence an alcohol must always be a constituent of the solution of silica produced, although an alcohol is not necessarily the solvent used, since a ketone, such as acetone, or toluene or other non-aqueous solvents may be used.

A suitable liquid for the purpose of the present invention is that described in the specification of United States Patent No. 1,809,755. The so-called basis solution prepared according to Example 1 of that specification is a typical solution for the purpose of the present invention.

The surface to be treated may if desired be coloured by the preliminary application of a pigment or colouring composition, and if unduly porous it may be given a preliminary application of a filling material.

Similarly the surface to be treated may be given a preliminary mechanical treatment such as rubbing or grinding to make it fairly smooth; alternatively or in addition it may be given a preliminary chemical treatment to cure it of any undue porosity as by soaking it with an alkaline solution e. g. ammonia, and drying out the solution superficially and then promptly applying the polishing liquid. As will be understood the alkaline solution acts on the polishing liquid as it commences to penetrate and immobilises it.

The polishing liquid may be applied in the first place in any convenient way as by brushing or spraying either uniformly or locally according to a pattern or stencil but is then rubbed in after the manner of French polishing, as it is this rubbing operation following upon the hardening of the at least partially hydrolyzed ester that produces the durable, moisture resistant, highly polished effect as distinct from an otherwise dull or matt effect.

I have found that the polishing effect of the rubbing is facilitated and improved by incorporating in the liquid a small proportion of a lubricant, such as a wax or vegetable oil or a high boiling organic substance of the kind known as high boiling solvents. For example a quantity of the basis solution above referred to may be mixed with decahydronaphthalene in the following proportion:

| | Parts by volume |
|---|---|
| Basis solution | 90 |
| Decahydronaphthalene | 10 |

The following are some useful details concerning the application of the liquid and the French polishing operation:

The surface to be treated is first flushed with the polishing liquid. If this first application is rapidly and entirely absorbed it can generally be assumed that satisfactory results will be obtained.

After absorption of the liquid by the surface the polishing operation proceeds by manual application of a pad made of cheese cloth, surgical lint, or other soft material free from "dressings," and having no loose fluff or free threads likely to drag in the polishing liquid.

To the pad may be applied at the start a few drops of a solution of paraffin wax (about 5%) in decahydronaphthalene, to reduce the surface friction of the pad on the surface. The pad to which the drops have been applied is rubbed on the palm of the hand for a few moments, and is then moistened with the polishing liquid and applied to the surface. At first the pad may be fairly well saturated, but as the polishing proceeds, the pad must be allowed to remain almost dry. By experience the operative acquires dexterity in the use of the pad.

During the last stages of the polishing as the pad is somewhat dry a further slight application of the solution of wax may be given to the face of the pad by moistening a finger in the solution and applying it to the pad.

In the case of hardwoods the grain may first be filled by rubbing in a suitable filler such as a paste made of micro talc and the polishing liquid. This filler may if desired be stained with suitable pigments.

It is to be understood that the invention is applicable to the production of a high polish in a variety of circumstances. For example it may be applied to old or new stonework, brickwork, plaster or woodwork; or to fresh plaster made of cement and water, or of cement, sand and water with or without colouring materials or fillers; it may also be applied to building blocks, tiles, panels, facings and the like, plain or reinforced; and either to such articles long after they have been formed in any known manner, or to articles freshly formed in any appropriate way, as by being moulded from a creamy cement facing composition and a coarser backing material.

In the case of desiring to ensure an extremely high polish the panel, tile, or like article to be surface-polished as above described may have a good initial surface condition ensured by forming the article on a rapidly vibrating table carrying the body portion or backing of the article face-upwards to which face a surfacing cream such as creamy cement is then applied and on which it hardens with a very smooth surface owing to the vibration. Tiles and panels having a backing of ply-wood or asbestos or plasterboard may advantageously be made in this way. To the initially good surface so obtained the above described polishing liquid is then applied as already explained.

What I claim is:

1. The method of producing a polished water-resistant surface coating upon porous articles of stone, brick, tile, wood, plaster and the like, which comprises pretreating said surface with an alkaline solution adapted to penetrate such surface and to act upon and immobilize an ester of silicic acid when contacted therewith, applying to the thus treated surface of such article a preservative layer of a polishing liquid essentially comprising at least one ester of silicic acid adapted to hydrolyze and deposit a hydrated silica; water; and a solvent for the ester; and thereafter vigorously rubbing the polishing liquid containing the resultant deposit of hydrated silica into the surface of said article, in the presence of a small amount of a lubricant, until a highly polished water-resistant coating is formed upon the surface of said article.

2. The method of producing a polished water-resistant surface coating upon porous articles of stone, brick, tile, wood, plaster and the like, which comprises pretreating said surface with ammonia, applying to the thus treated surface of such article a preservative layer of a polishing liquid essentially comprising at least one ester of silicic acid adapted to hydrolyze and deposit a hydrated silica; water; and a solvent for the ester; and thereafter vigorously rubbing the polishing liquid containing the resultant deposit of hydrated silica into the surface of said article, in the presence of a small amount of a lubricant, until a highly polished water-resistant coating is formed upon the surface of said article.

3. The method of producing a polished water-resistant surface coating upon porous articles of stone, brick, tile, wood, plaster and the like, which comprises pretreating said surface with an alkaline solution adapted to penetrate such surface and to act upon and immobilize an ester of silicic acid when contacted therewith, applying to the thus treated surface of such article a preservative layer of a polishing liquid essentially comprising at least one ester of silicic acid adapted to hydrolyze and deposit a hydrated silica; water; and a solvent for the ester; and thereafter vigorously rubbing the polishing liquid containing the resultant deposit of hydrated silica into the surface of said article until a highly polished water-resistant coating is formed upon the surface of said article.

NOEL SHAW.